(12) United States Patent
Keskula et al.

(10) Patent No.: US 9,397,354 B2
(45) Date of Patent: Jul. 19, 2016

(54) SYSTEMS AND METHODS TO MONITOR AND CONTROL A FLOW OF AIR WITHIN A FUEL CELL STACK

(71) Applicant: GM GLOBAL TECHNOLOGY OPERATIONS LLC, Detroit, MI (US)

(72) Inventors: Donald H. Keskula, Oxford, MI (US); Joseph Mussro, Pittsford, NY (US); Yanyan Zhang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 570 days.

(21) Appl. No.: 13/869,733

(22) Filed: Apr. 24, 2013

(65) Prior Publication Data

US 2014/0322625 A1    Oct. 30, 2014

(51) Int. Cl.
*H01M 8/04*         (2016.01)

(52) U.S. Cl.
CPC ...... *H01M 8/04753* (2013.01); *H01M 8/04395* (2013.01); *H01M 8/04992* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 2004/0107011 A1* | 6/2004 | Moselli | ................ | G05B 13/027 700/28 |
| 2008/0206608 A1* | 8/2008 | Lienkamp | ......... | H01M 8/04029 429/444 |
| 2011/0003222 A1* | 1/2011 | Margiott | ........... | H01M 8/04223 429/429 |

* cited by examiner

*Primary Examiner* — Jonathan Crepeau
(74) *Attorney, Agent, or Firm* — Phillips Ryther & Winchester; Jared L. Cherry

(57) ABSTRACT

Disclosed herein are systems and methods for monitoring and controlling a flow of air within a fuel cell stack. The fuel cell stack may include an air supply path to conduct a flow of air through the fuel cell. Sensors may be configured to determine parameters associated with the air supply path, such as pressure, flow rate, etc. A modeling system may further be configured to determine a modeled parameter associated with the air supply path. A control system may receive input from the one or more sensors and the modeling system to generate a baseline based on the measured parameter and the modeled parameter, determine a difference between the measured parameter and the modeled parameter, determine a change of the difference with respect to the baseline, determine that the change satisfies a criterion, and selectively implement a corrective action based upon satisfaction of the criterion.

20 Claims, 5 Drawing Sheets

SYSTEMS AND METHODS TO MONITOR AND CONTROL A FLOW OF AIR WITHIN A FUEL CELL STACK

TECHNICAL FIELD

This disclosure relates to systems and methods for monitoring and controlling a flow of air within a fuel cell stack. More specifically, but not exclusively, this disclosure relates to detection of leaks or blockages in an air supply path configured to conduct a flow of air through a fuel cell stack.

BACKGROUND

Passenger vehicles may include fuel cell ("FC") systems to power certain features of a vehicle's electrical and drivetrain systems. For example, an FC system may be utilized in a vehicle to power electric drivetrain components of the vehicle directly (e.g., electric drive motors and the like) and/or via an intermediate battery system. An FC system may include a single cell or, alternatively, may include multiple cells arranged in a stack configuration. Several fuel cells may be combined in an FC stack to generate a desired power output. Air flow through the FC may affect the performance of the FC system. Accordingly, leaks or blockages in an air supply path affecting air flow through a FC may negatively impact performance of the FC system.

BRIEF DESCRIPTION OF THE DRAWINGS

Non-limiting and non-exhaustive embodiments of the disclosure are described, including various embodiments of the disclosure with reference to the figures, in which.

SUMMARY

Figure 1:
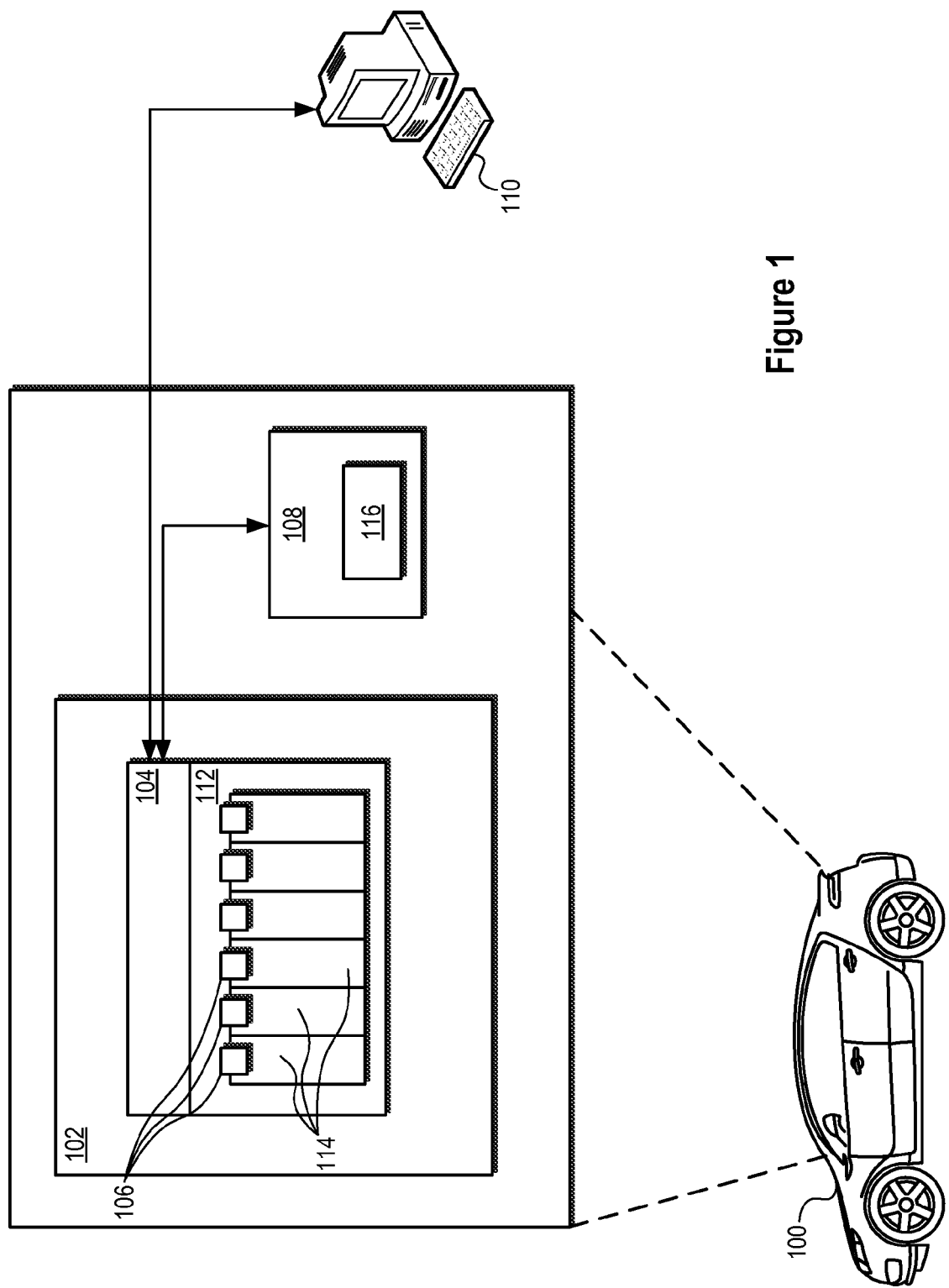
FIG. 1 illustrates a functional block diagram of an exemplary vehicle system consistent with embodiments disclosed herein.

Disclosed herein are a variety of systems and methods for monitoring and controlling a flow of air within a FC stack. The FC stack may include an air supply path configured to conduct a flow of air through the FC. One or more sensors may be configured to determine parameters associated with the air supply path, such as pressure, flow rate, etc. A modeling system may further be configured to determine a modeled parameter associated with the air supply path. According to some embodiments, the modeling system may run continuously while the FC stack is in operation. According to such embodiments, the modeling system may operate in conjunction with a control system configured to control the operation of the FC stack.

A baseline may be determined based upon the measured parameter and the modeled parameter. The baseline may change depending on operating conditions (e.g., primarily airflow, pressure settings, operating temperature, etc.). The baseline may be generated and maintained throughout the lifecycle of the FC stack, according to certain embodiments. A difference may also be determined between the measured parameter and the modeled parameter. A change of the difference with respect to the baseline may be indicative of a leak or obstruction in an air flow system.

According to various embodiments, the measured parameter and the modeled parameter may be a pressure in a cathode air supply path. According to certain embodiments, a change of the difference with respect to the baseline may be indicative of a leak or an obstruction in the cathode air supply path. Various systems disclosed herein may be configured to determine whether a change between the baseline and the difference is associated with a leak or an obstruction in the cathode air supply path.

The modeled parameter may be generated based upon a variety of inputs. According to one embodiment, the modeled parameter may be a modeled pressure, and the modeling system may base the modeled pressure, at least in part, on the position of a backpressure valve. The backpressure valve may be configurable within a range of positions in order to adjust a pressure set-point in a cathode air supply path.

A variety of corrective actions may be generated in response to the change of the difference with respect to the baseline that satisfies a criterion. According to certain embodiments consistent with the present disclosure, a user notification and/or a diagnostic code may be generated. The user notification and/or the diagnostic code may provide an indication of an obstruction or leak in the air supply path. The notifications may prompt a user to seek repair of the leak and/or removal of the obstruction from the air supply path.

DETAILED DESCRIPTION

A detailed description of systems and methods consistent with embodiments of the present disclosure is provided below. While several embodiments are described, the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture (such as a computer-readable storage medium), a method, and/or a product of a process.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

An air delivery device such as a compressor may be configured to generate a flow of air in an FC stack. The air delivery device may maintain a desired pressure or a pressure set-point, within an air supply path that is used to supply the FC components. A controller may calculate a manifold pressure set-point, and input from one or more sensors (e.g., a pressure sensor) may be used in a feedback control loop to control the air delivery device. A system controller may calculate a manifold pressure set-point, which may be used to control the air delivery device.

According to various embodiments disclosed herein, the pressure of a cathode air supply path may be controlled using a closed-loop control system based, at least in part, on a measurement provided by a pressure sensor at the cathode air supply path inlet. If a leak or blockage develops, the system may compensate by, for example, adjusting the position of a backpressure valve. Changing the position of the backpressure valve may increase or decrease the pressure in the cathode air supply path.

In certain circumstances, the cathode pressure model may not have sufficient information to determine the presence of a leak or blockage, and accordingly, may incorrectly predict the pressure based on the adjusted backpressure valve position. A change of the difference with respect to the baseline may be indicative of a leak or obstruction in an air flow system. The direction of the error may indicate whether a leak or a blockage is present.

Where a leak is present in an air supply path, a simulation system may estimate a pressure that exceeds the measured pressure. Where a blockage is present in the air supply path, the simulation system may estimate a pressure that is lower than the measured pressure. Based upon a determination that there is a leak or blockage, the system may implement actions to minimize durability or reliability impact, avoid potential fuel emissions, alert the driver that service is required, and help a service technician to identify the root cause of related performance issues.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

FIG. 1 illustrates a functional block diagram of an exemplary vehicle system 100 consistent with embodiments disclosed herein. The vehicle system 100 may be a motor vehicle, a marine vehicle, an aircraft, and/or any other type of vehicle or stationary power source (e.g., a generator). The vehicle 100 may include an FC system 102 including a FC stack 112 that, in certain embodiments, may be coupled with a high-voltage ("HV") battery system (not shown). The HV battery system may be used to power electric drivetrain components. In further embodiments, the FC stack 112 may be coupled with a low voltage battery and may be configured to supply electric energy to a variety of vehicle 100 systems including, for example, vehicle starter systems (e.g., a starter motor), lighting systems, ignition systems, climate control systems, and the like.

The FC stack 112 may be associated with an FC control system 104. The FC control system 104 may be configured to monitor and control certain operations of the FC stack 112. For example, the FC control system 104 may be configured to monitor and control adjustable performance parameters and voltage suppression operations of the FC stack 112. In certain embodiments, the FC control system 104 may be communicatively coupled with plurality of sensors 106 (e.g., voltage sensors, current sensors, and/or the like, etc.) and/or other systems configured to enable the FC control system 104 to monitor and control operations of the FC stack 112. For example, the plurality of sensors 106 in communication with the FC stack 112 may provide FC control system 104 with information that may be used to estimate a polarization curve. In certain embodiments the FC control system 104 may be configured to monitor each cell 114 of the FC stack 112 individually. The FC control system 104 may further be configured to provide information to and/or receive information from other systems included in the vehicle 100. For example, the FC control system 104 may be communicatively coupled with an internal vehicle computer system 108.

In certain embodiments, the FC control system 104 may be configured to provide information or notifications regarding the FC stack 112 to a user of the vehicle 100, vehicle computer system 108, and/or external computer system 110. Such information may include, for example, information regarding a leak or an obstruction in an air supply path associated with FC stack 112. Different types of notifications may be presented to different users. For example, control system 104 may provide a diagnostic code to a service technician indicating certain information about a leak or obstruction in an air flow system. In another example, upon detection of a leak or obstruction in an air flow system, control system 104 may provide a notification to a vehicle driver that the vehicle requires service. Where a leak is detected in a cathode air supply path that transports fuel to FC stack 112, control system 104 may notify a user of the potential for a fuel leak and may further advise the operator of the vehicle that repair service is needed.

A leak or obstruction in an air flow system may be detected, according to various embodiments using a comparison between a measured parameter and a modeled parameter. A modeling system 116 may receive information relating to the operation of FC stack 112. Such information may include, for example, measurements from a pressure sensor, information regarding the position of a backpressure valve, flow rates, etc. The modeling system 116 may be configured to process this information and determine an expected or modeled parameter. According to some embodiments, the modeled parameter may comprise a modeled pressure, a modeled flow rate, or other parameters.

The modeling system 116 may be implemented using a wide variety of simulation or modeling techniques. The modeling system 116 may, according to some embodiments, be embodied as computer-executable instructions stored on a non-transitory computer-readable storage medium. Although in the illustrated embodiment, the modeling system 116 is illustrated as a component of the vehicle computer 108, according to other embodiments, modeling system 116 may be implemented as a stand-alone system or may be integrated into control system 104. A variety of configurations and implementations are contemplated by the present disclosure. According to embodiments in which the modeling system 116 is associated with the vehicle computer 108, the modeling system may share resources of the vehicle computer 108 with other systems or processes executed on the vehicle computer 108.

Modeling system 116 may receive inputs from one or more sensors (e.g., sensors 106) in communication with FC stack 112. Such sensors may include, for example, temperature sensors, pressure sensors, air flow sensors, and the like. Modeling system 116 may also receive input from a backpressure valve in communication with the cathode air flow system. According to one embodiment, modeling system 116 may determine a modeled pressure based at least in part on a position of a backpressure valve. Further, modeling system 116 may, according to some embodiments, also receive information regarding other variables, such as a temperature associated with FC stack 112.

Based upon a comparison of a measured parameter (e.g., a measured pressure) and a modeled parameter (e.g., a modeled pressure), a baseline may be determined. The baseline may change depending on operating conditions (e.g., primarily airflow, pressure settings, operating temperature, etc.). The baseline may be generated and maintained throughout the lifecycle of the FC stack, according to certain embodiments. A difference may also be determined between the measured parameter and the modeled parameter. A change of the difference with respect to the baseline may be indicative of a leak or obstruction in an air flow system. According to various embodiments, the measured parameter and the modeled parameter may be a pressure in a cathode air supply path. According to certain embodiments, a change may be indicative of a leak or an obstruction in the cathode air supply path.

When the change between the baseline and the difference satisfies a criterion, a corrective action may be selectively implemented. The corrective action may include a variety of actions. For example, the corrective action may comprise adjusting operating parameters associated with FC stack 112. Further, the corrective action may comprise notifying a user of the need to obtain vehicle service. The user notification may, according to some embodiments, comprise an indication of the severity of the leak or obstruction in the cathode air flow system. The corrective action may comprise notifying the user of the possibility of a fuel leak, particularly where the fuel leak may pose a safety concern. Still further, the corrective action may comprise providing a diagnostic code to a technician that may inform the technician of the leak and/or blockage in the cathode air flow system.

Figure 2A:
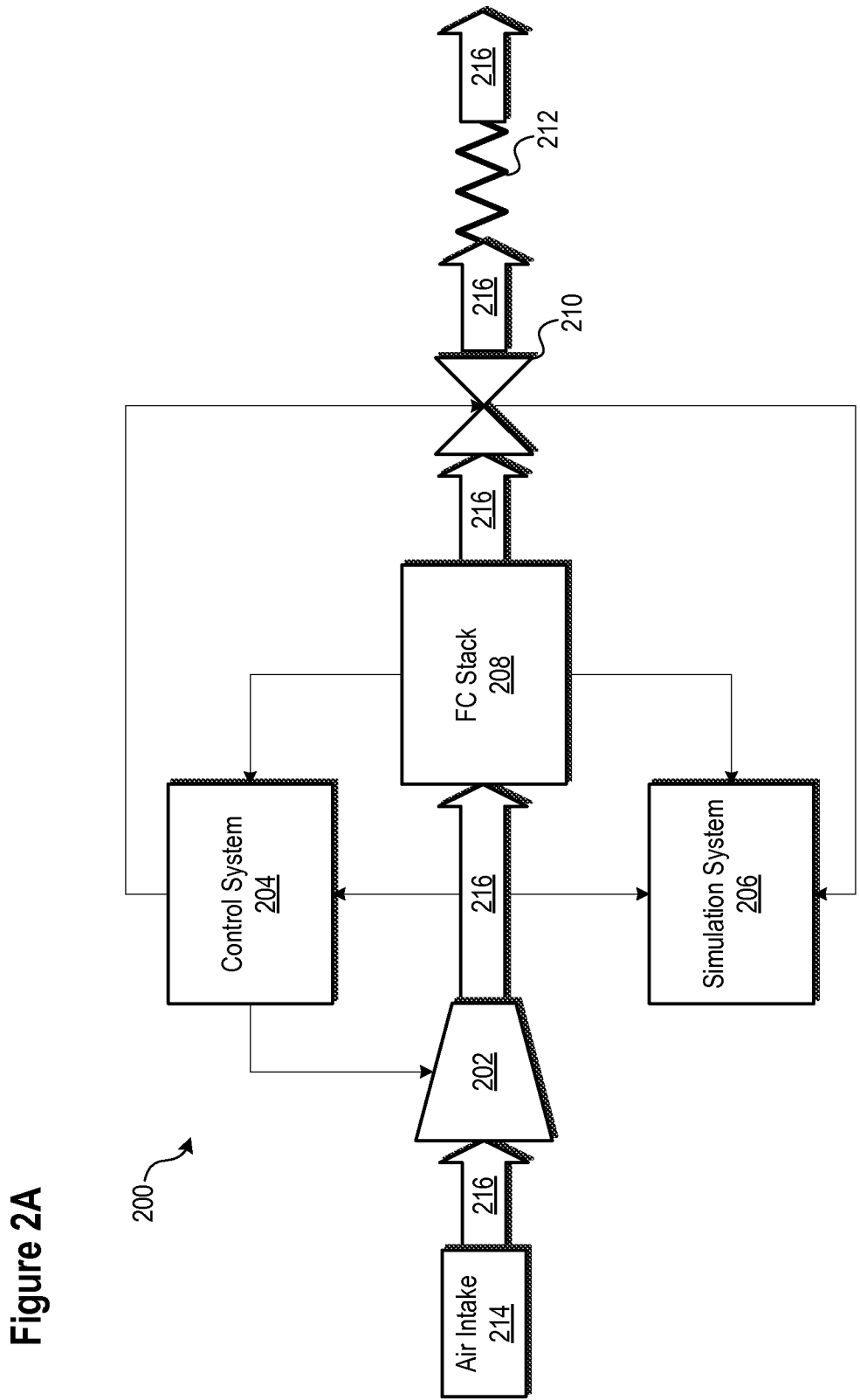
FIG. 2A illustrates a block diagram of a system for generating a flow of air through an air supply path consistent with embodiments disclosed herein.

FIG. 2A illustrates a block diagram of a system 200 for generating a flow of air through an air supply path 216 consistent with embodiments disclosed herein. According to the illustrated embodiment, the air supply path 216 is illustrated using large arrows. Solid lines refer to information exchanged among the illustrated components.

An air intake 214 may receive air from the environment and provide the air to a compressor 202. Compressor 202 may be configured to maintain a pressure in the air supply path 216 of system 200. The pressure maintained by compressor 202 may be referred to as a pressure set-point. The flow of air may be provided by compressor 202 to an FC stack 208. As will be recognized by a person of skill in the art, according to certain embodiments, a fuel may be added to the flow of air, and/or the flow of air may be conditioned (e.g., the humidity or temperature of the flow of air may be controlled). The flow of air may provide reactants to FC stack 208 and carry away byproducts of reactions occurring in FC stack 208.

A backpressure valve 210 may also be used to help to maintain a pressure set-point in the air supply path. The position of the backpressure valve 210 may be adjusted by control system 204 to increase or decrease pressure in the cathode air supply path. Backpressure valve 210 may offer a variety of discrete open positions or may be controlled via an analog system where fluid flow through the backpressure valve 210 can be set in order to maintain a particular pressure within the cathode air supply system. The position of the backpressure valve 210 may be influenced by the temperature of the system, the pressure of the system, and other factors.

The position of the backpressure valve 210 may be based upon a closed-loop feedback system incorporating control system 204 and a pressure sensor (not shown) in communication with the air supply path 216. When a measured pressure in the cathode air supply path falls below a set-point, the backpressure valve may adjust its position to reduce or impede the flow of air out of the air supply path 216. Accordingly, the pressure in the air supply path 216 may increase. When the measured pressure in the air supply path 216 increases above a set-point, the backpressure valve 210 may adjust its position to increase or facilitate the flow of air out of the air supply path 216. Accordingly, the pressure in the air supply path 216 may decrease. A tailpipe 212 may be in communication with backpressure valve 210. The tail pipe 212 may provide a resistance to the flow of air, and accordingly, the tail pipe 212 may increase the pressure in air supply path 216.

A simulation system 206 may receive data from the FC stack 208, the backpressure valve 210, and the control system 204. The simulation system 206 may simulate a pressure in the air supply path 216. The simulation system 206 may, according to one embodiment, receive a pressure from a sensor in communication with air supply path 216. A baseline may be determined based upon the measured parameter and the modeled parameter. A difference may also be determined between the measured parameter and the modeled parameter.

If a leak or blockage develops in air supply path 216, the system 200 may compensate by, for example, changing the position of the backpressure valve 210. The simulation system 206, since it is not provided with information regarding a leak/blockage, may incorrectly predict the pressure in air supply path 216 based on the adjusted backpressure valve 210 position. By observing a change between the baseline and the difference, it can be inferred that the air supply path 216 has developed a leak or blockage.

The direction of the change may indicate whether air supply path 216 has developed a blockage or a leak. Where a leak is present in air supply path 216, simulation system 206 may estimate a pressure that exceeds the baseline. Where a blockage is present in air supply path 216, simulation system 206 may estimate a pressure that is lower than the baseline. Based upon a determination that there is a leak or blockage, the system 200 can implement actions to minimize durability or reliability impact, avoid potential fuel emissions, alert the driver that service is required, and help the service technician to identify the root cause.

Figure 2B:
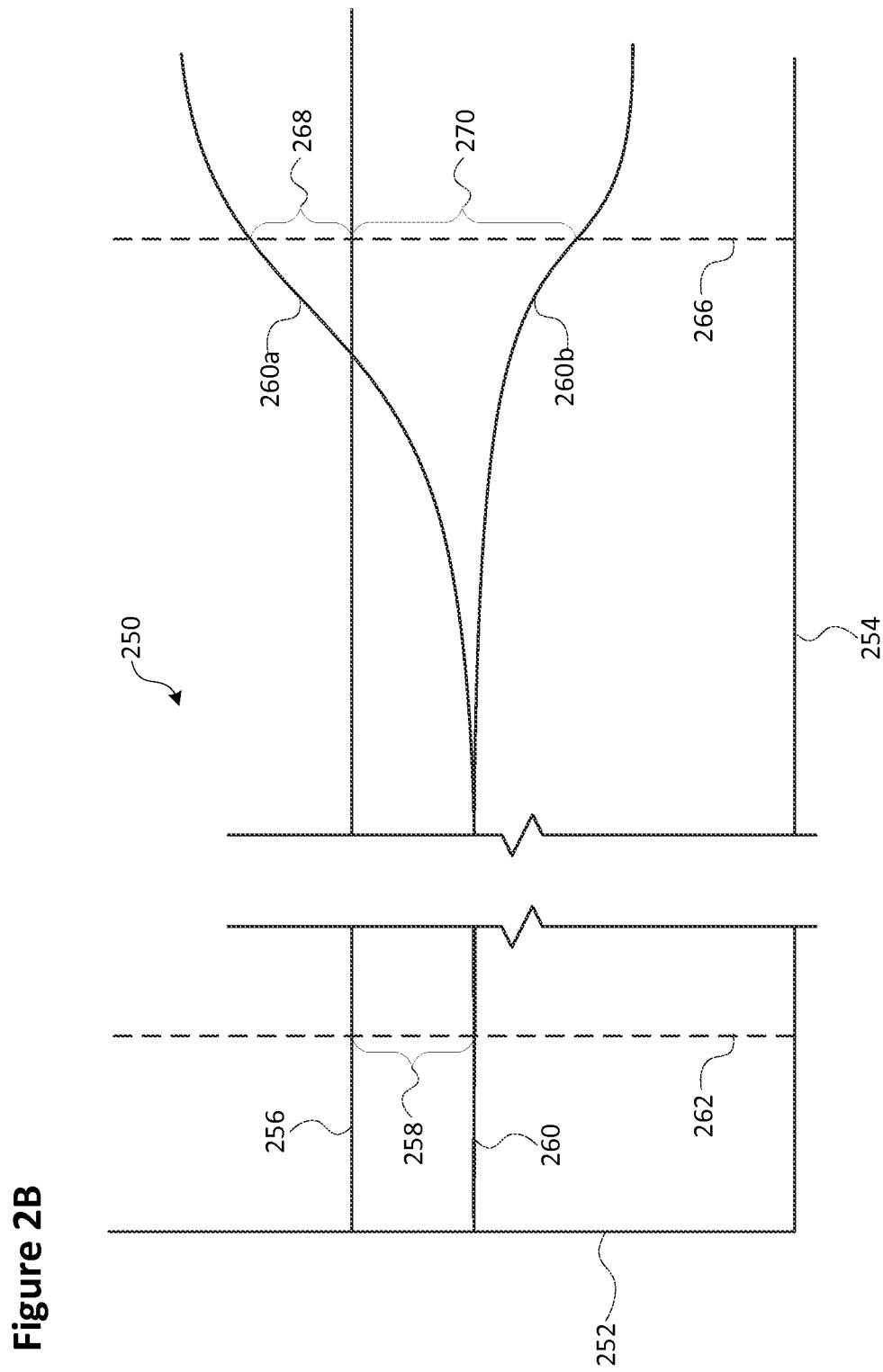
FIG. 2B illustrates a graph over time of a measured pressure and a modeled pressure in an air supply path, such as the air supply path illustrated in FIG. 2A.

FIG. 2B illustrates a graph 250 over time of a measured pressure 256 and a modeled pressure 260 in an air supply path, such as the air supply path illustrated in FIG. 2A. In the illustrated embodiment, time is plotted along axis 254 and pressure is plotted long axis 252. At a first time 262, a modeled pressure 260 and a measured pressure 256 may be determined. According to some embodiments, a baseline offset 258 may be present between the measured pressure 256 and the modeled pressure 260. According to some embodiments, the first time 262 may correspond to the beginning of life of a fuel cell system. The baseline offset 258 may account for any system-to-system and/or component-to-component variation (e.g. component tolerances). According to some embodiments, the baseline offset may be incorporated into the modeled pressure 260 by making adjustments to parameters of a simulation system. Deviation between the modeled pressure 260 and the measured pressure 256 may be indicative of a blockage or leak in the air supply path. According to the illustrated embodiment, the baseline offset 258 may remain relatively constant unless a leak or blockage develops in the air supply path.

As illustrated in FIG. 2B, at a certain point the baseline difference between the modeled pressure 260 and the measured pressure 256 begins to change. Two scenarios are shown. In the first scenario, the modeled pressure 260a begins to increase, and thus, is indicative of a leak in the air supply path. At a second time 266, the modeled pressure 260b exceeds the measured pressure 256 by an amount designated 268.

In the second scenario, the modeled pressure 260b begins to decrease, and thus, is indicative of an obstruction in the air supply path. At the second time 266, the measured pressure 256 exceeds the modeled pressure 260b by an amount designated 270. As illustrated, the difference between the measured pressure 256 and the modeled pressure 260b is greater than the baseline offset 258.

Figure 3:
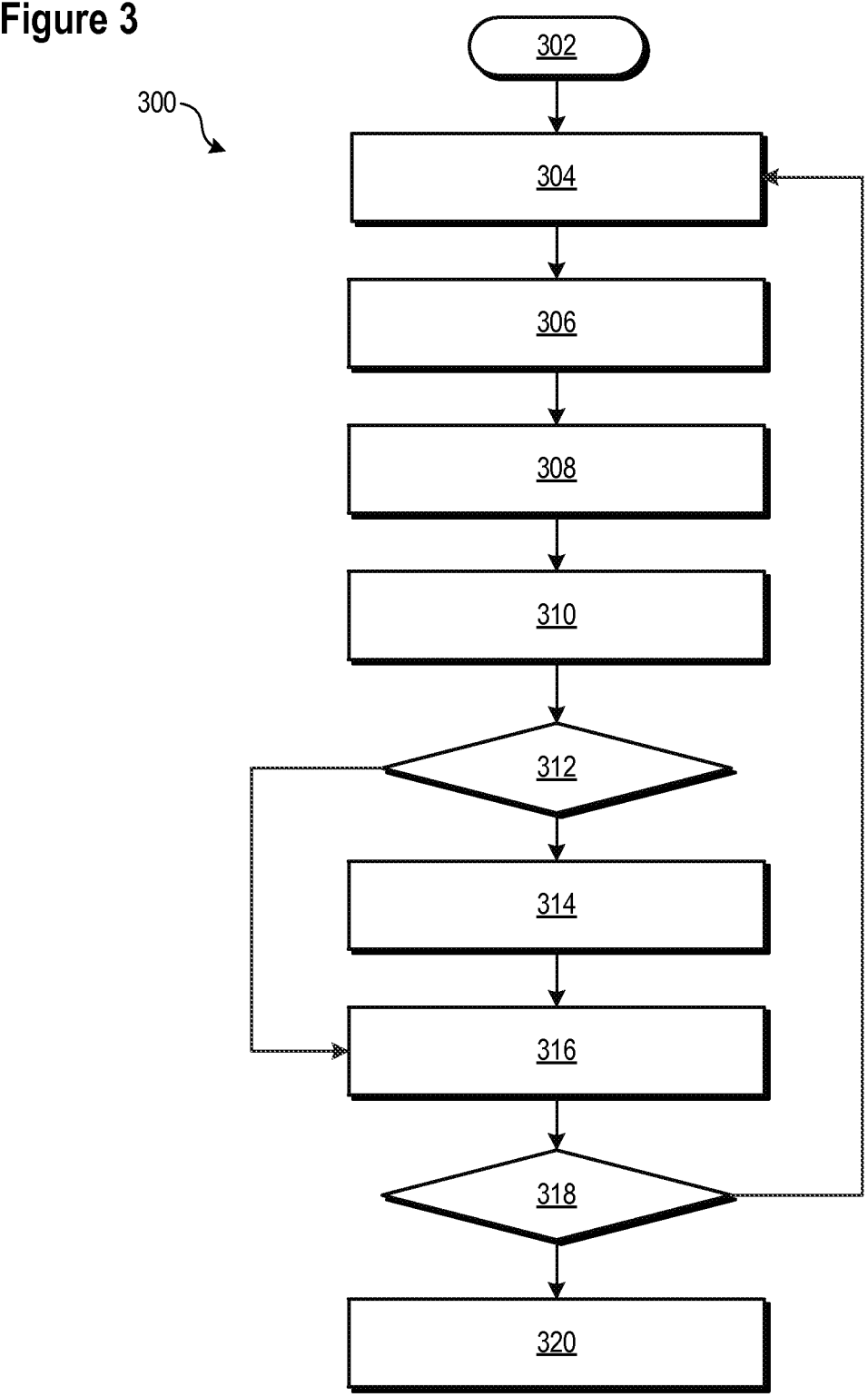
FIG. 3 illustrates a flow diagram of a method for detecting a leak or blockage in an air supply path in a fuel cell system consistent with embodiments disclosed herein.

FIG. 3 illustrates a flow diagram of a method 300 for detecting a leak or blockage in an air supply path in a fuel cell system consistent with embodiments disclosed herein. At 302, method 300 may be initiated. At 304, method 300 may determine in air flow and a pressure set-point in the air supply path. A compressor may be set at 306 to generate an air flow in the pressure set-point. According to some embodiments, the compressor may receive closed loop feedback from an air sensor in the air supply path.

A back pressure valve position may be established at 308 based on the pressure set-point. The back pressure valve may, according to some embodiments, receive closed loop feedback from a pressure sensor in the air supply path. The position of a backpressure valve may be adjusted to control the pressure in the air supply path. When a measured pressure in the cathode air supply path falls below a pressure set-point, the backpressure valve may adjust its position to reduce or impede the flow of air out of the air supply path. Accordingly, the pressure in the air supply path may increase. When the measured pressure in the air supply path increases above a set-point, the backpressure valve may adjust its position to increase or facilitate the flow of air out of the air supply path. Accordingly, the pressure in the air supply path may decrease.

At 310, a modeled pressure associated with the air supply path may be determined. The modeled pressure may be generated by a modeling system that receives inputs relating to the physical conditions of the air supply path. The modeling system may, according to some embodiments, be embodied as computer-executable instructions stored on a non-transitory computer-readable storage medium.

At 312, method 300 may determine whether a baseline offset has been determined. The baseline may be determined based upon the measured parameter and the modeled parameter. In the illustrated embodiment, determination of the baseline may occur only once. If the baseline has been determined, method 300 may progress to 316. According to other embodiments, however, the baseline may be continuously determined throughout the lifespan of an FC stack.

At 314, a baseline offset may be determined. The baseline offset may account for any system-to-system and/or component-to-component variation (e.g. component tolerances) according to some embodiments. The baseline may be determined based upon the measured parameter and the modeled parameter. The baseline may change depending on operating conditions (e.g., primarily airflow, pressure settings, operating temperature, etc.). According to some embodiments the baseline offset may be determined using Eq. 1.

$$P_{Baseline} = P_{Modeled\ at\ Time\ T} - P_{Measured\ at\ Time\ T}$$ Eq. 1

According to some embodiments, the time T may correspond to the beginning of a lifecycle of a fuel cell system. According to other embodiments, the time T may occur after a particular length of time, or may be periodically recalculated. At 316 a present value of the difference between a modeled pressure and a measured pressure may be determined using Eq. 2.

$$P_{Now} = P_{Modeled} - P_{Measured}$$ Eq. 1

At 318, the values of $P_{Baseline}$ and $P_{Now}$ may be compared. If the values are equal, method 300 may return to 304. If the values show a change, method 300 may proceed to 320. Determining the change may involve comparison of the baseline and the difference over a period of time. According to some embodiments, the period of time may be relatively short, while in other embodiments, the period of time may be relatively long.

At 320, the change may be compared against one or more criteria. A variety of criteria may be used in order to determine whether the change is indicative of a leak or blockage in an air supply path. For example, the magnitude of the change may be evaluated. If the change has a magnitude less than the threshold, the change may be disregarded. If the change has a magnitude greater than the threshold, one or more corrective actions may be implemented. In another example, the direction of the change may be determined. As described above, such a determination may indicate whether the difference is indicative of a blockage or a leak in the air supply path. An increase may be indicative of a leak, while a decrease may be indicative of a blockage.

A variety of corrective actions are contemplated. For example, the corrective action may include adjusting the operation of the compressor to adjust a pressure set-point. In another example, the corrective action may include notifying a user or a technician of the blockage or leak in the air supply path. Providing a notification may help to minimize durability or reliability impact, avoid potential fuel emissions, alert the driver that service is required, and/or help a service technician to identify the root cause of related performance issues.

According to various embodiments, differing operational conditions may result in adjustments to method 300. For example, according to some embodiments, different set-points may be established based on pressure and/or air flow characteristics. Further, different criteria may be evaluated to determine the presence of a blockage or a leak depending upon conditions. Still further, a plurality of baseline offset values may be developed, and a suitable baseline offset may be selected depending upon conditions.

Figure 4:
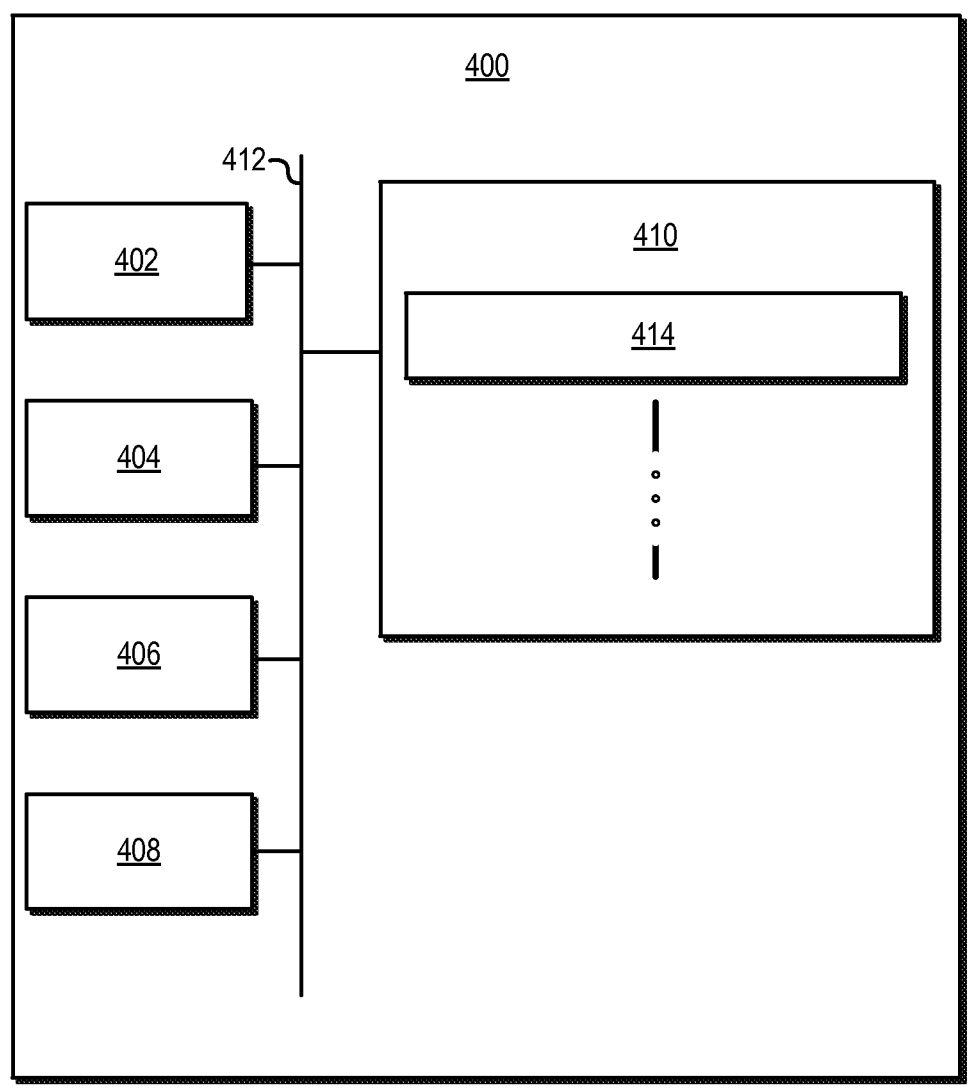
FIG. 4 illustrates a block diagram of a computer system for implementing various embodiments consistent with embodiments disclosed herein.

FIG. 4 illustrates a block diagram of a computer system 400 that may be utilized in implementing certain embodiments of the systems and methods disclosed herein. In certain embodiments, the computer system 400 may be a personal computer system, a server computer system, an on-board vehicle computer, an FC control system, and/or any other type of system suitable for implementing the disclosed systems and methods.

As illustrated, the computer system 400 may include, among other things, one or more processors 402, random access memory (RAM) 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

User interface 408 may include any number of devices allowing a user to interact with the computer system 400. For example, user interface 408 may be used to display an interactive interface to a user. The user interface 408 may be a separate interface system communicatively coupled with the computer system 400. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to computer system 400. For example, the communications interface 406 may allow the computer system 400 to communicate with other computer systems (e.g., computer systems associated with external databases and/or the Internet), allowing for the transfer as well as reception of data from such systems.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules configured to implement all or part of the functionality of the systems and methods described above.

Specific functional models that may be stored on computer-readable storage medium 410 include a simulation system module, a control system module, a notification interface module, and the like. A simulation system module may implement the modeling functionality described in connection with various embodiments of the present disclosure. More specifically, the simulation system module may be configured to perform the functions associated with simulation system 206, which is illustrated in FIG. 2A and described above. Further, a control system module may be configured to perform the functions associated with control system 204, which is also illustrated in FIG. 2A and described above.

Returning to a discussion of FIG. 4, a notification module may be configured to provide notification to a user or a technician of a leak or a blockage in an air supply path. According to some embodiments, the notification may be displayed via user interface 408. Further, the notification may be transmitted via the communications interface 406 to a diagnostic device, which may be used by a service technician to facilitate the diagnosis of certain problems and/or user notifications. Alternative embodiments may incorporate more or fewer modules, or alternatively, functionality that is described in connection with multiple modules may be performed by a single module.

The system and methods described herein may be implemented independent of the programming language used to create the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 400 may utilize any suitable operating system including, for example, Unix, DOS, Android, Symbian, Windows, iOS, OSX, Linux, and/or the like.

Many changes may be made to the details of the above-described embodiments without departing from the underlying principles of the present disclosure. The scope of the present invention should, therefore, be determined only by the following claims.

The invention claimed is:

1. A system to monitor and control a flow of air within a fuel cell stack, the system comprising:
 an air supply path configured to conduct a flow of air through a fuel cell stack;
 a sensor configured to determine a measured parameter associated with the air supply path;
 a modeling system programmed to determine a modeled parameter associated with the air supply path;
 a control system programmed to:
  generate a baseline based on the measured parameter and the modeled parameter,
  determine a difference between the measured parameter and the modeled parameter,
  determine a change of the difference with respect to the baseline,
  determine that the change satisfies a criterion, and
  generate a corrective action based upon satisfaction of the criterion.

2. The system of claim 1, wherein the measured parameter comprises a measured pressure in a cathode air supply path configured to supply a fuel mixed with the flow of air to a plurality of cathodes in the fuel cell stack, and the modeled parameter comprises a modeled pressure in the cathode air supply path.

3. The system of claim 2, further comprising:
 a backpressure valve configurable within a range of positions, the range of positions operable to adjust a pressure set-point;
 wherein the modeled pressure is based, at least in part, on an adjusted position of the backpressure valve.

4. The system of claim 2, further comprising:
 a compressor configured to induce the flow of air through the fuel cell stack;
 wherein the corrective action comprises adjusting the operation of one of the compressor the backpressure valve to adjust a pressure set-point in the air supply path.

5. The system of claim 1, wherein the control system is further programmed to determine that the change of the difference corresponds to one of a leak in the air supply path and an obstruction in the air supply path.

6. The system of claim 5, wherein the corrective action comprises generation of one of a user notification and a diagnostic code, the user notification and the diagnostic code configured to indicate the leak in the air supply path.

7. The system of claim 6, wherein the user notification comprises an indication that the leak comprises emission of a fuel.

8. The system of claim 5, wherein the corrective action comprises generation of one of a user notification and a diagnostic code, the user notification and the diagnostic code configured to indicate the obstruction in the air supply path.

9. The system of claim 1, wherein the baseline is configured to account for variation in one of a system tolerance parameter and a component tolerance parameter.

10. The system of claim 1, further comprising:
a processor; and
a non-transitory computer-readable storage medium;
wherein at least one of the modeling system and the control system comprise modules including computer-executable instructions stored on the non-transitory computer-readable storage medium and executable on the processor.

11. A method for monitoring and controlling a flow of air within a fuel cell stack, the method comprising:
inducing a flow of air in an air supply path configured to conduct the flow of air through a fuel cell stack;
determining a measured parameter of a characteristic of the air supply path using a sensor;
determining a modeled parameter associated with the air supply path using a modeling system;
determining a baseline based on the measured parameter and the modeled parameter;
determining a difference between the measured parameter and the modeled parameter;
determining a change of the difference with respect to the baseline;
determining that the change satisfies a criterion; and
generating a corrective action using a control system.

12. The method of claim 11, wherein the measured parameter comprises a measured pressure in a cathode air supply path configured to supply a fuel mixed with the flow of air to a plurality of cathodes in the fuel cell stack, and the modeled parameter comprises a modeled pressure in the cathode air supply path.

13. The method of claim 12, further comprising:
adjusting a position of a backpressure valve to adjust a pressure set-point;
wherein the modeled pressure is based, at least in part, on the position of the backpressure valve.

14. The method of claim 12, wherein the corrective action comprises adjusting the operation of one of a compressor or the backpressure valve to adjust a pressure set-point in the air supply path.

15. The method of claim 11, further comprising:
determining that the change in the difference corresponds to one of a leak in the air supply path and an obstruction in the air supply path.

16. The method of claim 15, further comprising generating one of a user notification and a diagnostic code configured to indicate the leak in the air supply path.

17. The method of claim 16, wherein the notification comprises an indication that the leak comprises emission of a fuel.

18. The method of claim 15, further comprising generating one of a user notification and a diagnostic code configured to indicate the obstruction in the air supply path.

19. The method of claim 11, wherein the baseline is configured to account for variation in one of a system tolerance parameter and a component tolerance parameter.

20. A system to monitor and control an air flow within a fuel cell stack, the system comprising:
a cathode air supply path in the fuel cell stack configured to permit a flow of air carrying a fuel to a plurality of cathodes in a plurality of fuel cells in the fuel cell stack;
a pressure sensor configured to determine a measured pressure associated with the cathode air supply path;
a compressor in communication with the cathode air supply path and the pressure sensor, the compressor configured to induce an air flow at a pressure set-point in the cathode air supply path;
a backpressure valve configurable within a range of positions, the range of positions operable to adjust the pressure set-point based, at least in part, on the measured pressure;
a pressure modeling system programmed to determine a modeled pressure associated with the fuel cell stack based at least in part on a position of the backpressure valve;
a control system programmed to:
generate a baseline based on the measured parameter and the modeled parameter,
determine a difference between the measured parameter and the modeled parameter,
determine a change of the difference with respect to the baseline,
determine that the change satisfies a criterion, and
selectively implement a corrective action based upon satisfaction of the criterion.

* * * * *